United States Patent [19]

Voelzke

[11] Patent Number: 5,490,754
[45] Date of Patent: Feb. 13, 1996

[54] HYDRAULIC UPPER DECK RAMP FOR A TRAILER

[75] Inventor: Harry E. Voelzke, Mitchell, S. Dak.

[73] Assignee: Dakota Mfg. Co.,Inc., Mitchell, S. Dak.

[21] Appl. No.: 429,032

[22] Filed: Apr. 26, 1995

[51] Int. Cl.[6] .................................................. B60P 1/00
[52] U.S. Cl. ................ 414/537; 414/482; 296/182; 14/71.7; 280/407.1; 280/656; 280/423.1
[58] Field of Search ............................ 414/537, 538, 414/539, 571, 349, 350, 346, 343, 480, 481, 471, 482, 483; 14/69.5, 71.1, 71.3, 71.7; 410/24.1, 26.24, 29, 29.1; 280/763.1, 407.1, 764.1, 400, 441.2, 656, 423.1; 296/181, 182, 183

[56] References Cited

U.S. PATENT DOCUMENTS

| | | |
|---|---|---|
| 2,717,707 | 9/1955 | Martin . |
| 3,602,384 | 8/1971 | Warren .................................. 414/483 |
| 3,779,411 | 12/1973 | Moretti, Jr. ............................ 414/482 |
| 4,132,323 | 1/1979 | Simmons ............................ 414/482 X |
| 4,372,727 | 2/1983 | Fredrickson et al. ................. 414/537 |
| 4,568,235 | 2/1986 | Bills, Jr. ............................ 414/482 X |
| 5,094,583 | 3/1992 | Bills,Jr. et al. ...................... 414/537 |
| 5,215,426 | 6/1993 | Bills, Jr. ............................. 414/537 |

FOREIGN PATENT DOCUMENTS

| | | | |
|---|---|---|---|
| 258795 | 12/1967 | Australia .............................. 14/72.3 |
| 2509166 | 11/1975 | Germany ............................. 410/24 |
| 6715907 | 5/1969 | Netherlands ......................... 414/537 |
| 1276542 | 12/1986 | U.S.S.R. ............................... 414/480 |
| 845674 | 8/1960 | United Kingdom .................. 414/537 |
| 1389236 | 4/1975 | United Kingdom .................. 414/482 |

*Primary Examiner*—Frank E. Werner
*Attorney, Agent, or Firm*—Zarley, McKee, Thomte, Voorhees & Sease; Dennis L. Thomte

[57] ABSTRACT

A trailer comprising a lower main deck and an upper deck positioned forwardly and upwardly of the main deck and including an upper deck ramp positioned at the forward end of the main deck which may be pivotally moved upwardly so that freight or equipment may be moved upwardly thereon from the main deck to the upper deck. Pivotally connected upper and lower scissor arms are provided at the opposite sides of the forward end of the upper deck ramp. A hydraulic cylinder is connected to each of the lower scissor arms adjacent the upper end thereof. The upper end of each of the upper scissor arms is connected to the forward end of the upper deck ramp with the lower end of the lower scissor arms being pivotally connected to the trailer frame. Extension of the hydraulic cylinders causes the scissor arms to spread apart to raise the upper deck ramp from a stored position to an inclined position. When the upper deck ramp is in its inclined position, the weight of the load on the upper deck ramp is carried by the scissor arms and is not carried by the hydraulic cylinders.

3 Claims, 2 Drawing Sheets

5,490,754

HYDRAULIC UPPER DECK RAMP FOR A TRAILER

BACKGROUND OF THE INVENTION

1. Field of the Invention

This invention relates to a trailer, and more particularly to a trailer having a lower main deck and an upper deck positioned at the forward end thereof. More particularly, this invention relates to a hydraulically operated upper deck ramp which may be positioned so as to extend upwardly forwardly from the main deck to the rearward end of the upper deck.

2. Description of the Related Art

Many types of trailers have been previously provided for transporting large equipment or freight over the road. Equipment is normally loaded onto the trailer from the rearward end thereof onto a main deck. In many trailer embodiments, an upper deck is positioned upwardly and forwardly of the lower main deck. Prior art trailers have included a pivotal ramp at the forward end of the lower main deck so that equipment or freight may be moved from the forward end of the lower main deck to the upper deck. In most cases, if not all, the pivotal ramp is raised and lowered by means of one or more hydraulic cylinders. To the best of applicant's knowledge, the prior art upper deck ramps suffer a major disadvantage in that the load carried by the upper deck ramp is transmitted to the hydraulic cylinder or cylinders which raise and lower the ramp, which can cause wear on the cylinder or cylinders and which can cause structural failure of the hydraulic cylinders.

SUMMARY OF THE INVENTION

A trailer is described having a lower main deck and an upper deck positioned at the forward end thereof. An upper deck ramp is normally positioned in its horizontal or stored position where it forms an extension of the main deck of the trailer. The rearward end of the upper deck ramp is pivotally connected to the forward end of the main deck. A pair of scissor lift mechanisms are connected to the opposite forward ends of the upper deck ramp. Each of the scissor lift mechanisms comprises a lower scissor arm having its lower end pivotally connected to the frame of the trailer and an upper scissor arm having its upper end pivotally connected to the forward end of the upper deck ramp. The lower end of the upper scissor arm is pivotally connected to the upper end of the lower scissor arm. A hydraulic cylinder is provided for each of the scissor lift mechanisms and has its base end pivotally connected to the trailer frame. The rod end of each of the hydraulic cylinders is pivotally connected to the pivotal connection of the associated lower and upper scissor arms. Extension of the hydraulic cylinders causes the scissor arms of each of the scissor lift mechanisms to pivot to raise the upper deck ramp so that the forward end of the upper deck ramp is positioned closely adjacent the rearward end of the upper deck. The pivotal connections of the scissor arms and the lengths thereof of each of the scissor lift mechanisms are carefully chosen so that when the upper deck ramp is in its upper position, the pivotal connection between the upper and lower scissor arms will be positioned forwardly of the dead center line between the lower pivotal connection of the lower scissor arm and the upper pivotal connection of the upper scissor arm. When the upper deck ramp is in its raised or elevated position, the lower scissor arm of each of the scissor mechanisms is positioned against the frame of the trailer so that the weight of the load on the upper deck ramp is not carried by the hydraulic cylinders, but is carried by the scissor arms.

It is therefore a principal object of the invention to provide a trailer having an improved upper deck ramp structure.

Still another object of the invention is to provide an upper deck ramp for a trailer which prevents the weight of the load on the upper deck ramp to be carried by structure other than the hydraulic cylinders which move the upper deck ramp between a stored position and a raised position.

These and other objects will be apparent to those skilled in the art.

DESCRIPTION OF THE PREFERRED EMBODIMENT

Figure 1:
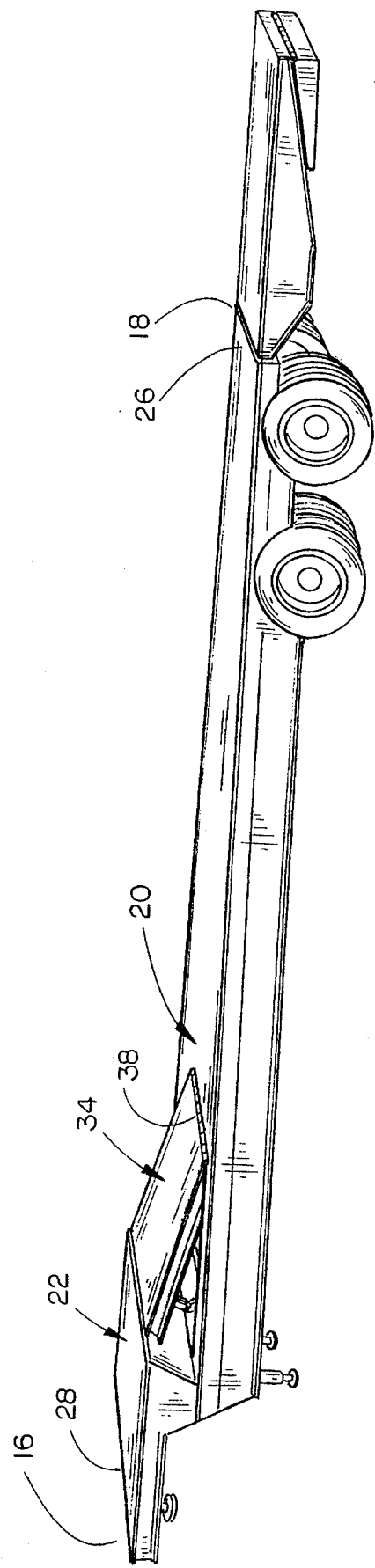
FIG. 1 is a perspective view of a trailer having the hydraulic upper deck ramp of this invention mounted thereon.

The trailer of this invention is referred to generally by the reference numeral 10 and is designed to be pulled by a conventional prime mover such as a truck or the like having a fifth-wheel trailer connection at its rearward end. Trailer 10 includes a wheeled frame means 14 having a forward end 16 and a rearward end 18. Trailer 10 includes a lower main deck 20 and an upper deck 22. For purposes of description, lower main deck 20 will be described as including a forward end 24 and a rearward end 26. Also for purposes of description, upper deck 22 will be described as including a forward end 28 and a rearward end 30. Wheeled frame means 14 is provided with a channel or frame member 32 which is substantially vertically disposed and which is positioned below the rearward end of upper deck 22, as seen in the drawings.

Figure 2:
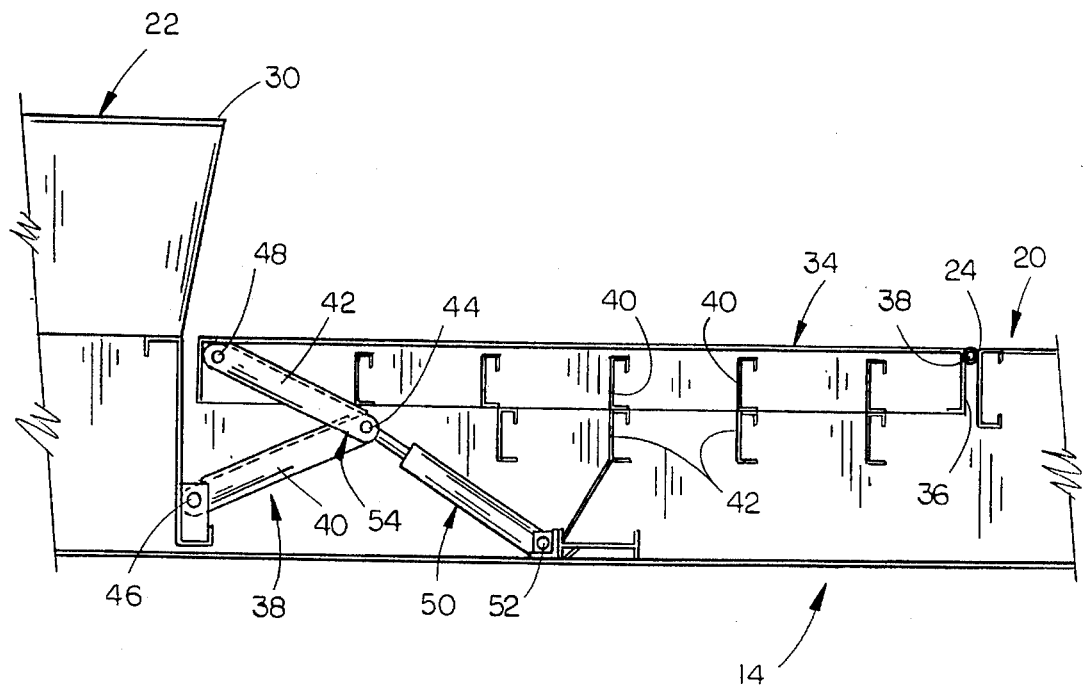
FIG. 2 is a partial longitudinal sectional view illustrating the upper deck ramp in a lowered or stored position.
Figure 3:
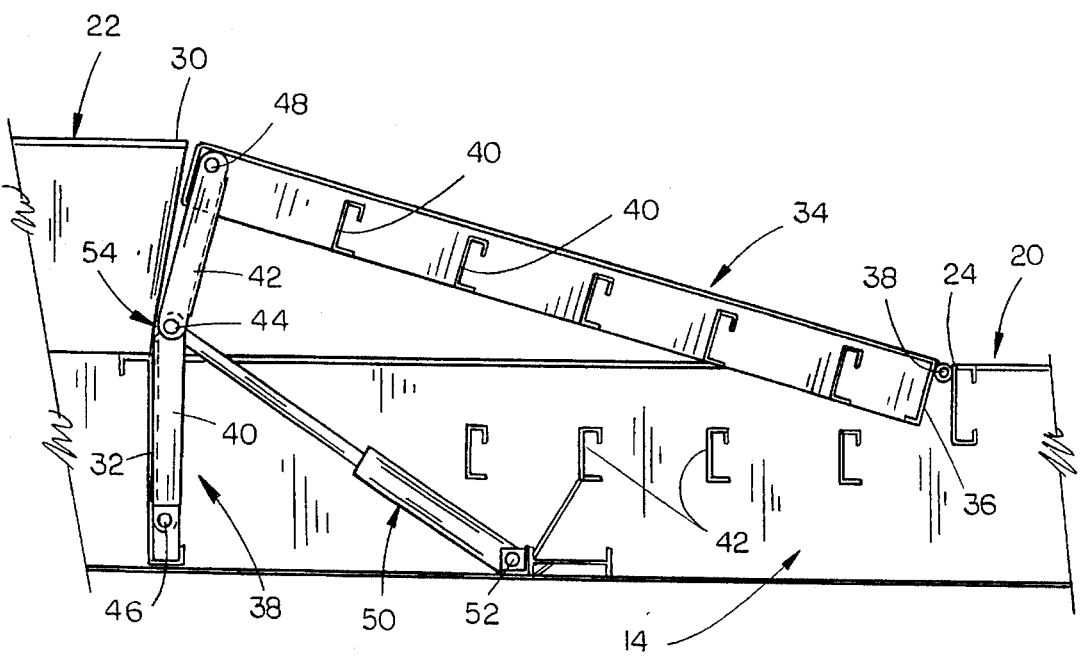
FIG. 3 is a view similar to FIG. 2 except that the upper deck ramp has been raised to its upper position.

The numeral 34 refers to the upper deck ramp of this invention which is positioned forwardly of the main deck 20 and which forms an extension or continuation thereof when the upper deck ramp 34 is in its horizontal lowered position, as illustrated in FIG. 2. As seen in FIGS. 2 and 3, the rearward end 36 of upper deck ramp 34 is pivotally connected to the forward end of main deck 20 at 38. When the upper deck ramp 34 is in its lowered or stored position, the frame members 40 thereof rest upon the frame members 42 of the wheeled frame means 14.

A scissor lift mechanism 38 is positioned at each of the opposite forward ends of the upper deck ramp 34 as will now be described. Each of the scissor lift mechanisms includes a lower scissor arm 40 and an upper scissor arm 42 pivotally connected at 44. The lower end of lower scissor arm 40 is pivotally connected to frame 32 at 46 as seen in the drawings. The upper end of upper scissor arm 42 is pivotally connected to the forward end of upper deck ramp 34 at 48. As seen in the drawings, the length of upper scissor arm 42 is shorter than the length of lower scissor arm 40. A hydraulic cylinder 50 is pivotally connected at its base end to the frame means of the trailer at 52. The rod end of the hydraulic cylinder 50 is pivotally connected to the pivotal connection 44.

When the upper deck ramp 34 is in its stored position, any weight carried thereon is transmitted to the frame members 42 of the trailer as seen in FIG. 2. When it is desired to move the upper deck ramp 34 to its upper position so that freight may be moved upwardly thereon to the upper deck 22, the hydraulic cylinder 50 on each of the scissor mechanisms is extended. As the hydraulic cylinders 50 are extended, the scissor arms are forced to spread apart thereby lifting the upper deck ramp 34 from the stored position of FIG. 2 to the upper position of FIG. 3.

The pivot points of the scissor arms and the lengths thereof are laid out in positions so that when the cylinders 50 are fully extended, the lower scissor arms 40 are abutting against the frame member 32. When cylinders 50 are in the extended position, the pivotal connection 44 is located forwardly of the pivotal connection 46 and the pivotal connection 48. In this position, the position of pivotal connection 44 may be described as being forwardly of the dead center line between the pivotal connections 46 and 48. When the hydraulic cylinders 50 are extended, the load on the upper deck ramp is not carried by the cylinders 50, but is carried by the scissor arms of the scissor lift mechanisms.

Preferably, the rod end of each of the hydraulic cylinders of each scissor lift mechanism is pivotally connected to the pivotal connection 46. However, the rod end of the cylinder could be pivotally connected to the lower scissor arm 40 adjacent the upper end thereof.

Thus it be seen that a novel upper deck ramp has been provided which ensures that the load carried on the upper deck ramp is not carried by the cylinders, but is carried by the scissor arms to prevent failure of the hydraulic cylinders. Thus it can be seen that the invention accomplishes at least all of its stated objectives.

I claim:

1. A trailer comprising:

a wheeled frame having rearward and forward ends;

means at the forward end of said wheeled frame for connection to a prime mover;

a lower main deck on said wheeled frame having rearward and forward ends;

an upper deck on said wheeled frame positioned forwardly of said main deck and having rearward and forward ends;

said upper deck being positioned above said main deck;

an upper deck ramp having rearward and forward ends;

said upper deck ramp having its rearward end pivotally secured to said main deck;

said upper deck ramp being pivotally movable between a first horizontally disposed position to a second upwardly inclined position;

said upper deck ramp serving as an extension of said main deck when in its said first position;

said upper deck ramp serving as a ramp extending upwardly from said main deck to said rearward end of said upper deck when in its said second position;

a first scissor lift mechanism comprising a lower scissor arm and an upper scissor arm, each of said lower and upper scissor arms having upper and lower ends;

the lower end of said lower scissor arm of said first scissor lift mechanism being pivotally secured to said wheeled frame below the forward end of said upper deck ramp;

the upper end of said upper scissor arm of said first scissor lift mechanism being pivotally connected to said upper deck ramp adjacent the forward end thereof;

said upper end of said lower scissor arm and said lower end of said upper scissor arm of said first scissor lift mechanism being pivotally connected together;

a first hydraulic cylinder having a lower base end and an upper rod end;

said lower base end of said first hydraulic cylinder being pivoted to said wheeled frame means;

said first hydraulic cylinder extending upwardly and forwardly from its base end towards said first scissor lift mechanism;

said rod end of said first hydraulic cylinder being operatively pivotally connected to said lower scissor arm of said first scissor lift mechanism;

a second scissor lift mechanism comprising a lower scissor arm and an upper scissor arm, each of said lower and upper scissor arms having upper and lower ends;

the lower end of said lower scissor arm of said second scissor lift mechanism being pivotally secured to said wheeled frame below the forward end of said upper deck ramp;

the upper end of said upper scissor arm of said second scissor lift mechanism being pivotally connected to said upper deck ramp adjacent the forward end thereof;

said upper end of said lower scissor arm and said lower end of said upper scissor arm of said second scissor lift mechanism being pivotally connected together;

a second hydraulic cylinder having a lower base end and an upper rod end;

said lower base end of said second hydraulic cylinder being pivoted to said wheeled frame means;

said second hydraulic cylinder extending upwardly and forwardly from its base end towards said second scissor lift mechanism;

said rod end of said second hydraulic cylinder being operatively pivotally connected to said lower scissor arm of said second scissor lift mechanism;

the extension of said first and second hydraulic cylinders causing said first and second scissor lift mechanisms to raise said upper deck ramp from its said first position to its said second position so that said forward end of said upper deck ramp is positioned adjacent the rearward end of said upper deck;

said wheeled frame having a substantially vertically disposed frame member positioned forwardly and below the forward end of said upper deck ramp when said upper deck ramp is in its said first position;

the pivotal connection between said upper and lower scissor arms of said first and second scissor lift mechanisms being positioned forwardly of the dead center line extending between the lower pivotal connection of said lower scissor arm and the upper pivotal connection of said upper scissor arm;

said lower scissor arm of each of said first and second scissor lift mechanisms being in engagement with said substantially vertically disposed frame, when said upper deck ramp is in its said second position, so that the load on said upper deck ramp is carried by said substantially vertically disposed frame rather than said hydraulic cylinders.

2. The structure of claim 1 wherein said rod end of said first hydraulic cylinder is pivotally connected to the pivotal connection of said lower and upper scissor arms of said first scissor lift mechanism and wherein said rod end of said second hydraulic cylinder is pivotally connected to the pivotal connection of said lower and upper scissor arms of said second scissor lift mechanism.

3. The structure of claim 1 wherein each of said lower scissor arms have a length greater than each of said upper scissor arms.

* * * * *